United States Patent
Lee et al.

(10) Patent No.: US 9,014,417 B1
(45) Date of Patent: Apr. 21, 2015

(54) METHOD AND APPARATUS FOR THEMES USING PHOTO-ACTIVE SURFACE PAINT

(71) Applicant: Google Inc., Mountain View, CA (US)

(72) Inventors: Johnny Lee, Mountain View, CA (US); Eric Teller, Palo Alto, CA (US); William Graham Patrick, San Francisco, CA (US); Eric Peeters, Mountain View, CA (US)

(73) Assignee: Google Inc., Mountain View, CA (US)

( * ) Notice: Subject to any disclaimer, the term of this patent is extended or adjusted under 35 U.S.C. 154(b) by 194 days.

(21) Appl. No.: 13/657,348

(22) Filed: Oct. 22, 2012

(51) Int. Cl.
*G06K 9/00* (2006.01)

(52) U.S. Cl.
CPC .................................. *G06K 9/00496* (2013.01)

(58) Field of Classification Search
USPC ........................................................ 382/100
See application file for complete search history.

(56) References Cited

U.S. PATENT DOCUMENTS

| | | | |
|---|---|---|---|
| 5,319,747 A | 6/1994 | Gerrissen et al. | |
| 6,256,033 B1 | 7/2001 | Nguyen | |
| 6,840,627 B2 | 1/2005 | Olbrich | |
| 7,259,747 B2 | 8/2007 | Bell | |
| 7,611,396 B2 * | 11/2009 | Schnuckle | 446/220 |
| 8,237,654 B2 | 8/2012 | Kang | |
| 8,603,723 B2 * | 12/2013 | Chang et al. | 430/139 |
| 8,730,183 B2 | 5/2014 | Lundback et al. | |
| 2001/0012001 A1 | 8/2001 | Rekimoto et al. | |
| 2004/0205394 A1 | 10/2004 | Plutowski | |
| 2005/0094109 A1 | 5/2005 | Sun et al. | |
| 2006/0007188 A1 | 1/2006 | Reiner | |
| 2006/0026521 A1 | 2/2006 | Hotelling et al. | |
| 2006/0259184 A1 | 11/2006 | Hayes et al. | |
| 2007/0139367 A1 | 6/2007 | Goffin | |
| 2007/0150953 A1 | 6/2007 | Hamid et al. | |
| 2007/0285399 A1 | 12/2007 | Lund | |
| 2008/0004953 A1 | 1/2008 | Ma et al. | |
| 2010/0160041 A1 | 6/2010 | Grant et al. | |
| 2011/0161998 A1 | 6/2011 | Alberth et al. | |
| 2012/0050687 A1 | 3/2012 | Berry et al. | |
| 2012/0154511 A1 | 6/2012 | Hsu et al. | |
| 2012/0218417 A1 | 8/2012 | Bilger et al. | |
| 2013/0050258 A1 * | 2/2013 | Liu et al. | 345/633 |

FOREIGN PATENT DOCUMENTS

EP    1591984 A2    11/2005

OTHER PUBLICATIONS

"Zombie-licious: Making Monsters with Lasers and Glow Paint," <http://gajitz.com/zombie-licious-making-monsters-with-lasers-and-glow-paint/>, Printed Aug. 6, 2012, 3 pages.

* cited by examiner

*Primary Examiner* — Tom Y Lu

(74) *Attorney, Agent, or Firm* — Blakely Sokoloff Taylor & Zafman LLP

(57) ABSTRACT

A method and apparatus for enabling themes using photo-active surface paint is described. The method may include capturing image data with at least a camera of a painted surface display system. The method may also include analyzing the image data to determine a real-world context proximate to a painted surface, wherein the surface is painted with a photo-active paint. The method may also include selecting a theme based on the determined real-world context. The method may also include generating a theme image, and driving a spatial electromagnetic modulator to emit electromagnetic stimulation in the form of the theme image to cause the photo active paint to display the theme image.

21 Claims, 5 Drawing Sheets

US 9,014,417 B1

METHOD AND APPARATUS FOR THEMES USING PHOTO-ACTIVE SURFACE PAINT

TECHNICAL FIELD

Embodiments of the invention relate to the field of large-scale display systems, and more particularly, to the generation of large-scale displays.

BACKGROUND

Large wall displays can be prohibitively expensive as the cost to manufacture display panels rises exponentially with display area. This exponential rise in cost arises from the increased complexity of large monolithic displays, the decrease in yields associated with large displays (a greater number of components must be defect free for large displays), and increased shipping, delivery, and setup costs. The exponential rise in cost also includes the energy requirements associated with large wall displays. As a result, typical large wall displays are impractical for personal or home usage.

SUMMARY

A method and apparatus for enabling themes using photo-active surface paint is described. According to an exemplary method, image data is captured with at least a camera of a painted surface display system. In one embodiment, the image data is analyzed to determine a real-world context proximate to a painted surface, wherein the surface is painted with a photo-active paint. Furthermore, in one embodiment, a theme is selected based on the determined real-world context. In one embodiment, a theme image is generated, and spatial electromagnetic modulator is driven to emit electromagnetic stimulation in the form of the theme image to cause the photo active paint to display the theme image.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1A:
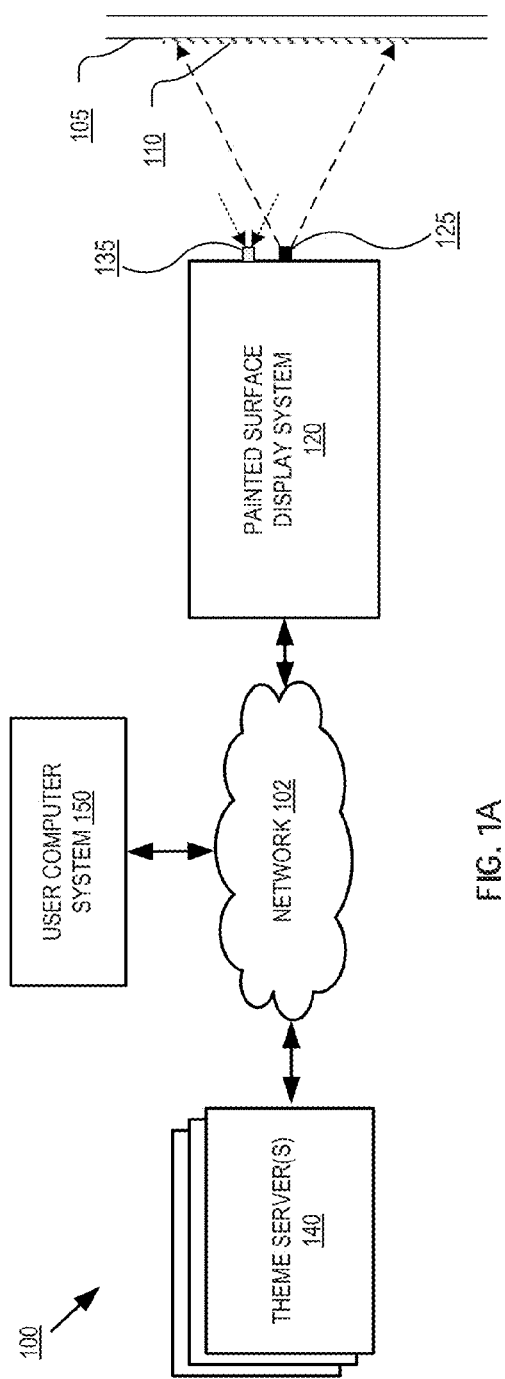
FIG. 1A is a block diagram of exemplary system architecture for enabling themes using dynamic surface paint.

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "capturing", "analyzing", "selecting", "generating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1A is a block diagram of exemplary system architecture 100 for enabling themes using dynamic surface paint. In one embodiment, the system 100 includes painted surface display system (PSDS) 120, user computer system 150, and one or more theme server(s) 140. In one embodiment, PSDS 120, user computer system 150, and theme server(s) 140 may be computing devices, such as a desktop computer, laptop computer, personal digital assistant, tablet computer, a mobile telephone, a cellular communication enabled wearable device, etc. In one embodiment, PSDS 120 is a web-enabled self-contained computing device.

In one embodiment, audio-visual inputs/sensor inputs 135 and a spatial electromagnetic (EM) modulator 130 are coupled with PSDS 120. Although only a single PSDS 120 and user computer system 150 are illustrated, in the embodiments discussed herein, a plurality of PSDSs 120 and/or a plurality of user computer systems 150 may be deployed to support themes on painted surfaces as discussed below.

The PSDS 120, user computer system 150, and server(s) 140 may be coupled to a network 102 that communicates any of the standard protocols for the exchange of information. In one embodiment, user computer system 150 and PSDS 120 may be coupled with network 102 via a wireless connection, such as a cellular telephone connection, wireless fidelity connection, etc. The PSDS 120, user computer system 150, and server(s) 140 may run on one Local Area Network (LAN) and may be incorporated into the same physical or logical system, or different physical or logical systems. Alternatively, the PSDS 120, user computer system 150, and server(s) 140 may reside on different LANs, wide area networks, cellular telephone networks, etc. that may be coupled together via the Internet but separated by firewalls, routers, and/or other network devices. It should be noted that various other network configurations can be used including, for example, hosted configurations, distributed configurations, centralized configurations, etc.

Figure 1B:
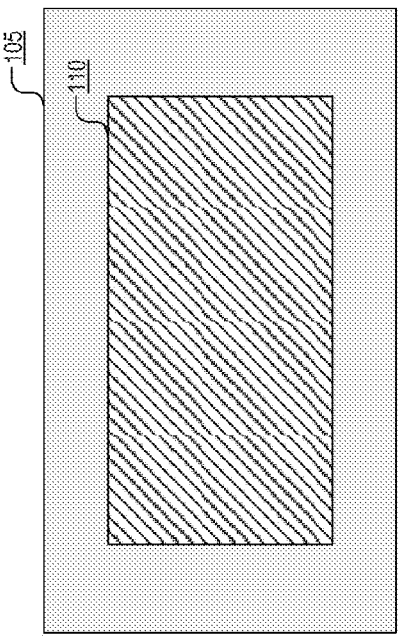
FIG. 1B illustrates a perspective view of a surface painted with a photo-active paint.

In one embodiment, PSDS 120 enables the display of images and/or videos on a painted surface. In one embodiment, a surface 105, such as a wall, floor, ceiling, surface of an object, etc. within the real world, is painted with a photo-active paint 110. In one embodiment, the photo-active paint is stimulated by light of one or more particular wavelengths that displays an image in response to illumination. In one embodiment, the photo-active paint is stimulated by heat generated, for example, by a laser, by an electron beam, etc. by PSDS 120. FIG. 1B illustrates another perspective of surface 105 painted with a photo-active paint 110. The photo-active paint 110 may be a photo-luminescent paintable material that emits visible spectrum light in response to one or more of electromagnetic stimulation on a photo-chromic paintable material and temperature stimulation on a thermo-chromic paintable material that changes light absorption/reflection properties in response to the electromagnetic stimulation. These photo-active paints are available from companies such DuPont™, 3M™, and others.

In one embodiment, and as discussed in greater detail below, PSDS 120 includes a spatial electromagnetic EM modulator 125 and a display engine (not shown) coupled to drive the spatial EM modulator 225 with an image. In one embodiment, PSDS 120 includes also includes an AV/sensor input 235 to capture image, sound, temperature, light, etc. data for analysis. In one embodiment, the analysis of the input data is provided as feedback to the display engine which further drives spatial electromagnetic EM modulator 125 to update the image generated by spatial electromagnetic EM modulator 125.

In one embodiment, PSDS 120 may be positioned remotely relative to surface 105 with a line of sight view of photo-active paint 110 painted on the surface 105. For example, PSDS 120 may be mounted on a ceiling, back wall, or shelf. In one embodiment, during operation of the PSDS 120, spatial EM modulator 125 illuminates paint 110 with an image and/or video. Spatial EM modulator 125 may emit photons at different wavelengths (e.g., UV or visible spectrum), or emit electrons, in the form of an image, video, or pattern for illuminating paint 110.

If paint 110 is a photo-luminescent material, then the image illuminated onto paint 110 will cause paint 110 to re-emit photons in a pattern indicative of the image output by spatial EM modulator 125 of PSDS 120. In some embodiments, the response time of paint 110 is quick enough to facilitate video images, or slow enough to display still images for finite periods of time. The still images may be refreshed periodically with the same image or a new image, thereby providing a low power display surface.

If paint 110 is a photo-chromic material, then illumination by spatial EM modulator 125 of PSDS 120 causes paint 110 to alter its light absorbing/reflecting properties. For example, the illuminated regions of paint 110 may change color. If photo-chromic paint is illuminated with an image, then the image is displayed on surface 105. Again, the response time of paint 210 may be quick enough to facilitate video images, or slow enough to display still images for finite periods of time. The still images may be refreshed periodically with the same image or a new image, thereby providing a low power display surface. In one embodiment, photo-active paint 110 is a bi-stable e-ink, which can be made to change between one of two colors via appropriate illumination by spatial EM modulator 125. In one embodiment, photo-active paint 110 may be a tri-stable system, of a plurality of regions of the paint that include 3 color patches (one each of R, G, and B) in each region to show mainly one of those colors.

In one embodiment, PSDS 120 may output a registration pattern onto paint 110, which AV/sensor input 135 then captures. The captured image and sensor data is analyzed by PSDS 120 to determine the size of area painted on surface 105, properties of the painted surface (i.e., refresh rate, photo-sensitivity, imaging quality capabilities, color display capabilities, etc.), which is then used to adjust the zoom, size, video frame rate, etc. of the images and/or videos output from PSDS 120. If a user repaints surface 105 with a larger or smaller painted area 110, repaints surface 105 with a different photo-active paint, or positions PSDS 120 relative to a different painted surface (not shown), then PSDS 120 can be recalibrated. Additionally, if surface 105 is painted with a slow response photo-active paint 110, PSDS 120 may monitor the image as it fades and determine the appropriate refresh rate and duty cycle for operating a display engine that drives EM modulator 125.

In one embodiment, photo-active paint 110 is a pixilated layout of multiple different photo-active paints, each having a different spectral response to illumination. For example three different R, G, B photo-active paints may be applied to surface 105 in a pixilated grid. When the R-type photo-active paint is illuminated, it subsequently emits or reflects red light for a period of time, when the G photo-active paint is illuminated, it subsequently emits or reflects green light for a period of time, and when the B-type photo-active paint is illuminated, it subsequently emits or reflects blue light for a period of time. By aligning or timing the EM stimulation from EM modulator 125 of PSDS 120 with the color grid painted surface, the appearance of color images and videos may be created. Of course, other color combinations, or even gray scale paints may be used.

It should be appreciated that surface 105, as illustrated in FIGS. 1A and 1B need not be just a wall. Rather, any surface (flat or curved) may be coated with photo-active paint 110 and become a blank canvas upon which image and videos may be displayed and updated at will. Furthermore, in the embodiments discussed herein, photo-active paint 110 may be transparent or translucent in an unexcited state, and then become darker or emit photons in an excited state (i.e., when stimulated by light, heat, etc.). The translucent or transparent photo-active paint could be applied to surface 105 when it is desirable for surface 105 to remain visible under the paint.

In one embodiment, the images, videos, or patterns displayed with the photo-active paint 110 on surface 105 may be based on a theme. In one embodiment, a theme is a package of AV data that contains audio and/or visual content related to a central topic. In one embodiment, the content may be decorative, informative, or both. Typically, themes have been used to customize the appearance of user computer systems, cell phones, etc. However, in one embodiment, a theme generated by PSDS 120 and displayed with photo-active paint 110 on surface 105 is used to customize the look and feel of a physical space (e.g., a wall, surface, object, etc.). In one embodiment, one or more PSDSs, such as PSDS 150, may be utilized to display a theme on more than one surface of a room, in more than one room of a structure, etc. so that each surface of a room, all rooms of a house, etc. display the same theme art, images, and/or video.

For example, themes generated by PSDS 120 for display on photo-active paint 110 may be holiday specific (e.g., a creepy scene for Halloween, a winter wonder land for Christmas, etc.), specific to the time of year (e.g., display winter images during winter months but summer images during summer months), a screensaver, responsive to the weather, etc.

In one embodiment, themes displayed by PSDS 120 on a surface 105 painted with photo-active paint 110 may be static or dynamic. In one embodiment, a static theme may be displayed by PSDS 120 by refreshing an image displayed by EM modulator 125. In another embodiment, a theme may be static based on the chemistry of photo-active paint 110. That is, the deterioration of an image displayed on photo-active paint may be slow, thereby giving the appearance of a static image. Furthermore, the deterioration of static images displayed with photo-active paints may be used within a theme by having a surface painted with different refresh rates so that portions of an image deteriorate before other portions. Furthermore, the inherent decay of photo-active paint adds to the effect of slowly changing theme room art.

In one embodiment, a theme displayed by PSDS 120 may be dynamic. In one embodiment, where photo-active paint 110 has a response time quick enough to enable an image refresh rate sufficient for video or other animations, a theme displayed by PSDS 120 may include animations (e.g., a photo slideshow, a video stream, etc.), images that change in response to data gathered from theme server(s) 140 or other remote systems (e.g., a sports scoreboard theme that dynamically changes as the score of a sporting event changes, a weather theme that graphically displays a forecast and current condition as reported from a weather server, etc.), a theme that changes in response to which particular users are within the same room as PSDS 120, etc.

In one embodiment, PSDS 120 is web enabled so that it may communicate over network 102 with user computer system 150 and theme server(s) 140. In one embodiment, themes presented by PSDS 110 may be customized by a user. In on embodiment, the customization of themes is achieved by receipt of one or more user preferences via direct input to PSDS 110, or by preferences entered at user computer system 150 which are then transmitted to PSDS 120. In either case, PSDS 120 may store different themes, which are selected by PSDS 120 and used to display themes on one or more painted surfaces based, at least in part, on the user preferences.

In one embodiment, PSDS 120 may also select between different themes to display on a photo-active painted surface 105 based on a context. In one embodiment, the context may be based on a combination of one or more of user presence near PSDS 120, user preferences, time of day, time of year, data culled from one or more theme servers 140, context data within a particular theme, sensor data, etc. In one embodiment, AV/sensor input 135 may include a camera for capturing images, a microphone for capturing sound, and one more sensors for capturing ambient data, such as humidity, light, temperature, etc. In one embodiment, PSDS 120 may perform one or more computer vision processes on the captured image data to, for example, recognize the faces of users near PSDS 120, recognize colors proximate to PSDS 120 (i.e., the color of a user's clothing, the color of proximate furniture, etc.). In one embodiment, the results of the computer vision processes are utilized as context data for theme selection by the PSDS 120. Similarly, PSDS 120 may utilize audio data to, for example, recognize a specific user's voice, and may utilize sensor data to, for example, recognize whether the lights are on or off in a room where the PSDS 120 is located, to enable selection between themes.

In one embodiment, PSDS 120 further selects how to display themes on a photo-active painted surface 105 based on the context. As discussed herein, the context may also include real-world factors that impact how a theme will be displayed, such as a corner in the room where theme image(s) will be displayed, a picture hanging on a photo-active painted surface in an area where theme images will be displayed, a tulip lamp persistently in the way of an EM modulator of PSDS 120, etc. In one embodiment, PSDS 120 adapts theme images to these real-world context factors by reformulating theme image(s), selectively displaying parts of a theme, altering the layout of theme images, incorporating real-world objects into a theme image display, etc. In one embodiment, PSDS's 120 determination of how to adapt a theme display to real-world factors enables PSDS 120 to respond to issues which might not have been planned on by a theme creator. For example, PSDS 120 may generate a Halloween theme that projects spider webs onto photo-active painted surface 105. If there is one or more persistent real-world obstacles, such as a framed picture hung on photo-active painted surface 105, or a corner of a wall of photo-active painted surface 105, PSDS 120 may move the spider webs around, adjust sizes of one or more spider webs, etc. until they do not overlap persistent real-world obstacles. Furthermore, PSDS 120 may use the persistent real-world obstacles in a theme display, such as the pictures hung on the photo-active painted surface 105 by generating the displayed spider webs off the edges of the picture frame, wall corner/edge, etc. and onto the photo-active painted surface.

In one embodiment, users may download themes from theme server(s) 140 to PSDS 120 via user computer system 150 or by direct interaction with PSDS 120 (e.g., interaction with a user interface generated by PSDS 120 on painted surface 105). In one embodiment, the theme server(s) 140 may provide a themes marketplace where different themes are available for purchase. For example, a professional sports league could provide PSDS themes for specific teams (e.g., a San Francisco 49ers theme that updates an opponent and score for live games, provides decorative 49er images and animations over the course of the game, causes 49er colors to be displayed on a wall, etc.). Similarly, a weather service could provide a weather theme that dynamically updates the theme display based on current weather conditions provided from a weather server. As another example, a theme may include pages of a book, graphic novel, or comic that are refreshed at periodic intervals, or in response to different user gestures.

Figure 2:
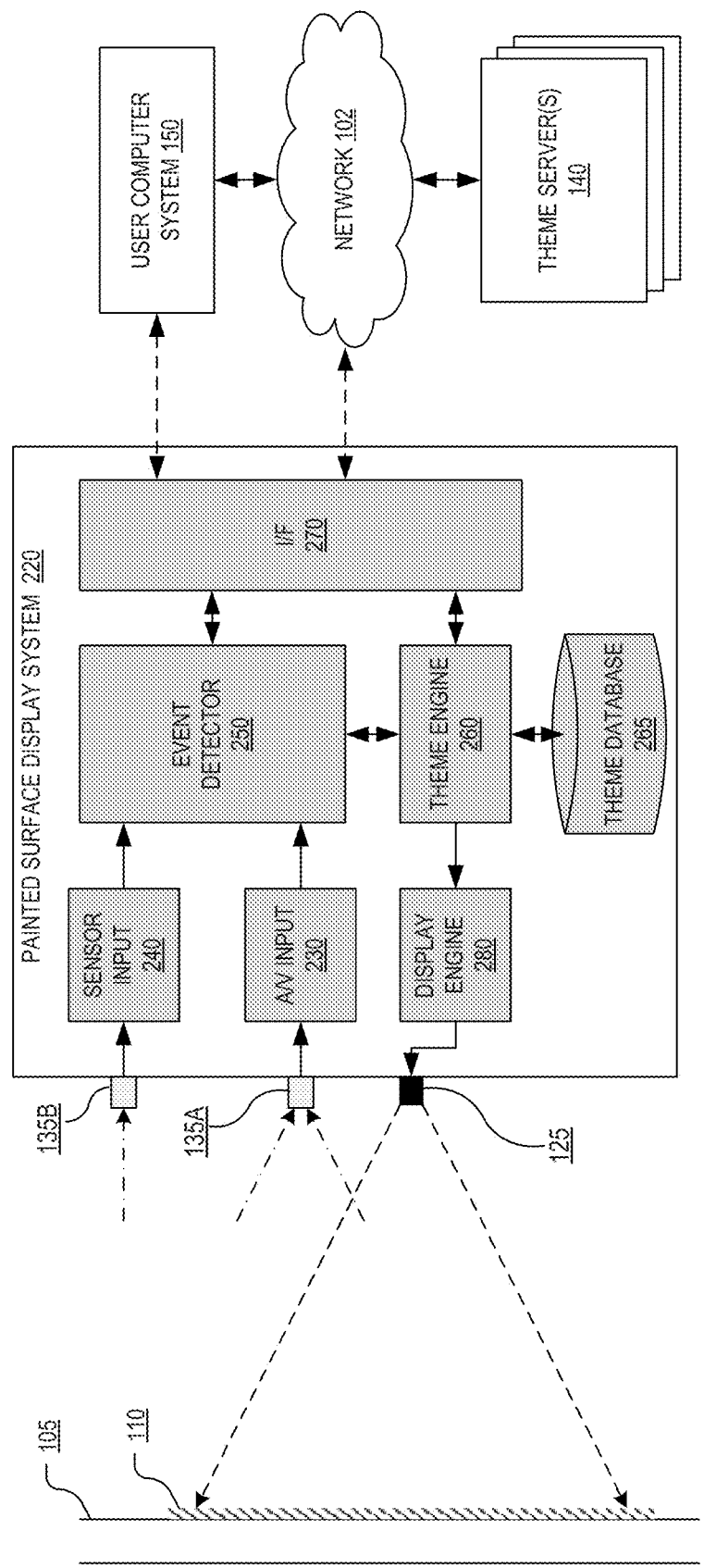
FIG. 2 is a block diagram of one embodiment of painted surface display system.

FIG. 2 is a block diagram of one embodiment 220 of painted surface display system (PSDS). PSDS 220, as illustrated in FIG. 2, provides additional details for the PSDS 120 discussed above in FIG. 1A.

In one embodiment, PSDS 220 may include one or more sensors 135B coupled with a sensor input 240, one or more audio-visual (A/V) capture devices 135A (e.g., a camera, microphone, etc.) coupled with A/V input 230, an event detector 250, a web enabled interface (I/F) 270, a theme engine 260 coupled with theme database 265, and a display engine 280 coupled with a spatial electromagnetic EM modulator 125. In one embodiment, the PSDS 220, user computer system 150, and theme server(s) 140 communicate with each other over various networks and network configurations as discussed above in FIG. 1A. Furthermore, in one embodiment, PSDS 220 may be coupled with user computer system 150 by wired, wireless, or near filed communication connection.

In the PSDS 220, as discussed above, display engine 280 is coupled to drive the spatial EM modulator 225 with one or more image and/or videos. In one embodiment, the images and videos are themed for displaying a package of AV data that contains decorative and/or informative content related to a central topic. In one embodiment, the theme images and video are generated by PSDS 220 and displayed with photo-active paint 110 on surface 105 to customize the look and feel of a physical space (e.g., a wall, surface, object, etc.). In one embodiment, as discussed below, the theme displayed with photo-active paint 110 on surface 105 is based on one or more of a real-world context, an inherent context, context data gathered from one or more remote servers, such as theme server(s) 140, and user preferences.

In order for PSDS 220 to enable context-based theme displays on photo-active paint 110 painted onto surface 105, A/V input 230 receives A/V data from one or more A/V capture devices 135A. In one embodiment, A/V capture devices 230 capture real-world data, such as images or videos of users, objects proximate to surface 105 (e.g., furniture within a room, interior decorating items, animals/pets, persistent obstacles, etc.), as well as other real-world objects proximate to the painted surface. In one embodiment, sensor input 240 also receives sensor data from one or more sensors 135B, such temperature data, light data, humidity data, wind speed, ambient noise level, etc. In one embodiment, the A/V data and/or sensor data received by A/V input 230 and sensor input 240 are provided to event detector 250.

In one embodiment, event detector 250 receives the monitored real-world context data from A/V input 230 and sensor input 240 in order to determine a context relevant for theme selection by theme engine 260. That is, event detector 250 analyzes the data provided by A/V input 230 utilizing, for example, one or more computer vision processes, such as image recognition, face recognition, motion recognition, gesture recognition, etc. In one embodiment, the analyzed data is used to determine whether, for example, specific users are proximate to PSDS 220 (e.g., within a room where PSDS 220 will display a theme), whether a user has performed a physical gesture relevant to a theme, whether a user has been sedentary for a period of time that exceeds a threshold (i.e., the user is sleeping), whether the user is moving (i.e., the user is awake), what color shirt a user is wearing, what color furniture is in a room where surface 105 is located, etc. Although specific examples are discussed above, event detector 250 may perform computer vision processes to recognize additional real-world context data.

In one embodiment, event detector 250 performs additional analysis of the sensor data received from sensor input 250. For example, sensors 135B may include a light sensor for detecting a level of ambient light. In this example, event detector 250 could determine from the light sensor data whether it is night or day, whether lights in a physical space where surface 105 is located are on, etc.

In one embodiment, event detector 250 further analyzes inherent context data and external context data to build an overall context for PSDS 220. In one embodiment, inherent context data is data known by PSDS 220, such as user theme preferences (e.g., user A's favorite color is blue, user B desires themes relevant to the color of their clothing, user C is a sports fanatic with an interest in specified teams, etc.), time of day, time of year, etc. Furthermore, the external context data is context data gathered from remote sources, such as theme server(s) 140 via network 102 (e.g., current weather forecast obtained from a weather server, sports scores obtained from a sports reporting server, images provided by an image server, etc.).

In one embodiment, event detector 250 utilizes one or more of the monitored context data, inherent context data, and external context data to determine an overall context surrounding the PSDS 220. For example, from the monitored context data, inherent context data, and external context data, event detector 250 of PSDS 220 may determine, from face recognition, that user A is within a physical space proximate to surface 105. Furthermore, event detector 250 of PSDS 220 may further determine that user A has entered a preference for themes that display current weather reports when weather is bad, where the weather reports are obtained by a weather server. By utilizing the various types of context data, event detector 250 is able to build a comprehensive real-world context from which themes can be selected. Furthermore, in one embodiment, event detector 250 continually or periodically receives data from A/V input 230 and sensor input 250 so that event detector 250 can monitor for changes in context.

In one embodiment, theme engine 260 receives the determined context data from event detector 250. In one embodiment, theme engine utilizes the context data to select a theme from theme database 265. In one embodiment, themes may be pre-loaded into database 265. In another embodiment, themes may be purchased by a user of user computer system 150 from one or more theme servers 140, and downloaded into theme database. As discussed here, themes may include color-based themes to match colors proximate to painted surface 105 (e.g., clothing color, furniture color, a user's specific color preferences, etc.), scoreboard themes, weather-based themes, book themes (e.g., displaying pages of a book and enabling a user to change pages of the book, etc.), holiday themes, etc. Furthermore, in one embodiment, the themes may be persistent in that they cause PSDS 220 to generate a static image. Themes may also be dynamic, such as video based themes, themes that automatically change based on new context data, themes that change automatically on data obtained from theme server(s) 140, etc.

Whether themes are purchased, free, or pre-loaded into database 265, in one embodiment, theme engine 260 may receive user preferences from user computer system 150. The user preferences may be stored with corresponding themes in database 265. Alternatively, the user preferences may be stored in a user record within database 265, which may be accessed by theme engine 260 when selecting a theme for a specific user.

In one embodiment, the context-base theme selected by theme engine 260 is received by display engine 280. As discussed above, display engine 280 drives spatial EM modulator 125 to cause an image to be displayed by photo-active paint 110. In one embodiment, the display of the theme by the PSDS 220 and the photo-active paint enables a large-scale theme display.

In one embodiment, the themes may be displayed across multiple PSDS systems. Although not illustrated, multiple PSDS systems may be utilized to display the same theme on multiple surfaces of a physical space, or a photo-active painted surface located in different physical spaces. For example, the same theme may be displayed in each room of a house for a user. Then as the user moves through the house, they are presented the same theme. In one embodiment, PSDSs may communicate with each other to inform other PSDSs as to what themes are currently being displayed. In another embodiment, PSDSs may be autonomous and utilize their corresponding event detectors to determine which themes to display by observing themes displayed with the other PSDSs.

Figure 3:
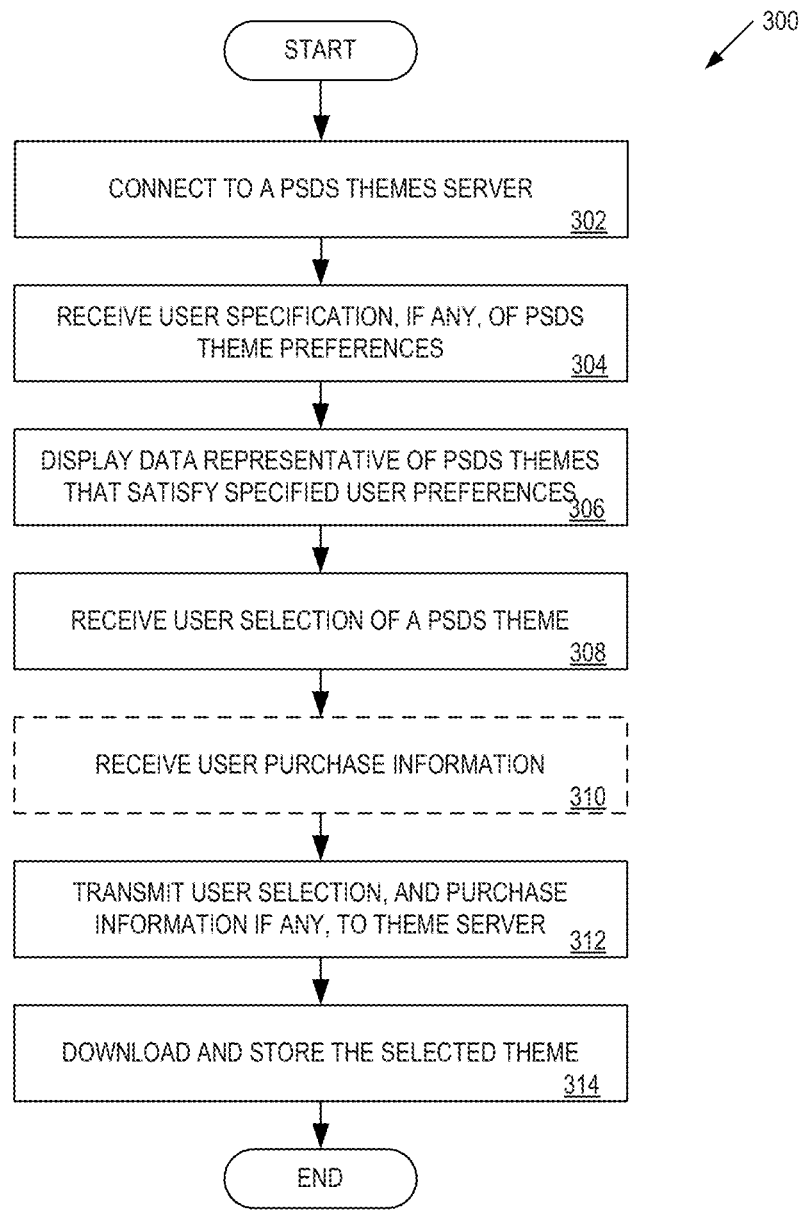
FIG. 3 is a flow diagram of one embodiment of a method for downloading themes to a painted surface display system.

FIG. 3 is a flow diagram of one embodiment of a method 300 for downloading themes to a painted surface display system. The method 300 is performed by processing logic that may comprise hardware (circuitry, dedicated logic, etc.), software (such as is run on a general purpose computer system or a dedicated machine), firmware, or a combination. In one embodiment, the method 300 is performed by a user interacting with a PSDS 120 or PSDS 220, or by a user interacting with a computer system 150 coupled with a PSDS 120 or PSDS 220.

Referring to FIG. 3, processing logic begins by connecting to a PSDS themes server (processing block 302). In one embodiment, PSDSs are web-enabled and may communicate over various network configurations, such as the internet. In one embodiment, the PSDS interfaces, via a network, with a theme store or marketplace. In another embodiment, a user computer system may connect to the theme store or marketplace via the internet.

Processing logic then receives user specification, if any, of PSDS theme preferences (processing block 304). For example, user theme preferences might specify the user is interested in color-based themes (e.g., to match the user's favorite color, a dynamic color-based theme that matches the color of a user's clothing, etc.), sports-based themes (e.g., a dynamically updated scoreboard, a package of graphics related to the user's favorite sport or team, etc.), weather-based themes (e.g., themes that display images or art relevant to a current weather forecast, a theme that alerts the user as to irregular weather patterns, etc.), as well as other themes.

Processing logic displays data representative of PSDS themes that satisfy specified user preferences (processing block 306). In one embodiment, the data may include a theme preview for display by a PSDS. In another embodiment, the data may include a reduced scale representation of the theme, such as a thumbnail image.

Processing logic receives user selection of a PSDS theme (processing block 308), and user purchase information when necessary (processing block 310). As discussed herein, some themes may be available for purchase via an online store or marketplace, while other themes may be free. Thus, processing logic optionally receives user payment information when a theme is selected which must be purchased.

Processing logic transmits the user selection, and purchase information if any, to theme server (processing block 312). After the user payment information, if any, is verified, processing logic then downloads and stores the selected theme (processing block 314). In one embodiment, the theme is downloaded to one or more PSDSs that are associated with the user that selected and/or purchased the theme. In one embodiment, the theme is stored in a themes database of the PSDSs.

Figure 4:
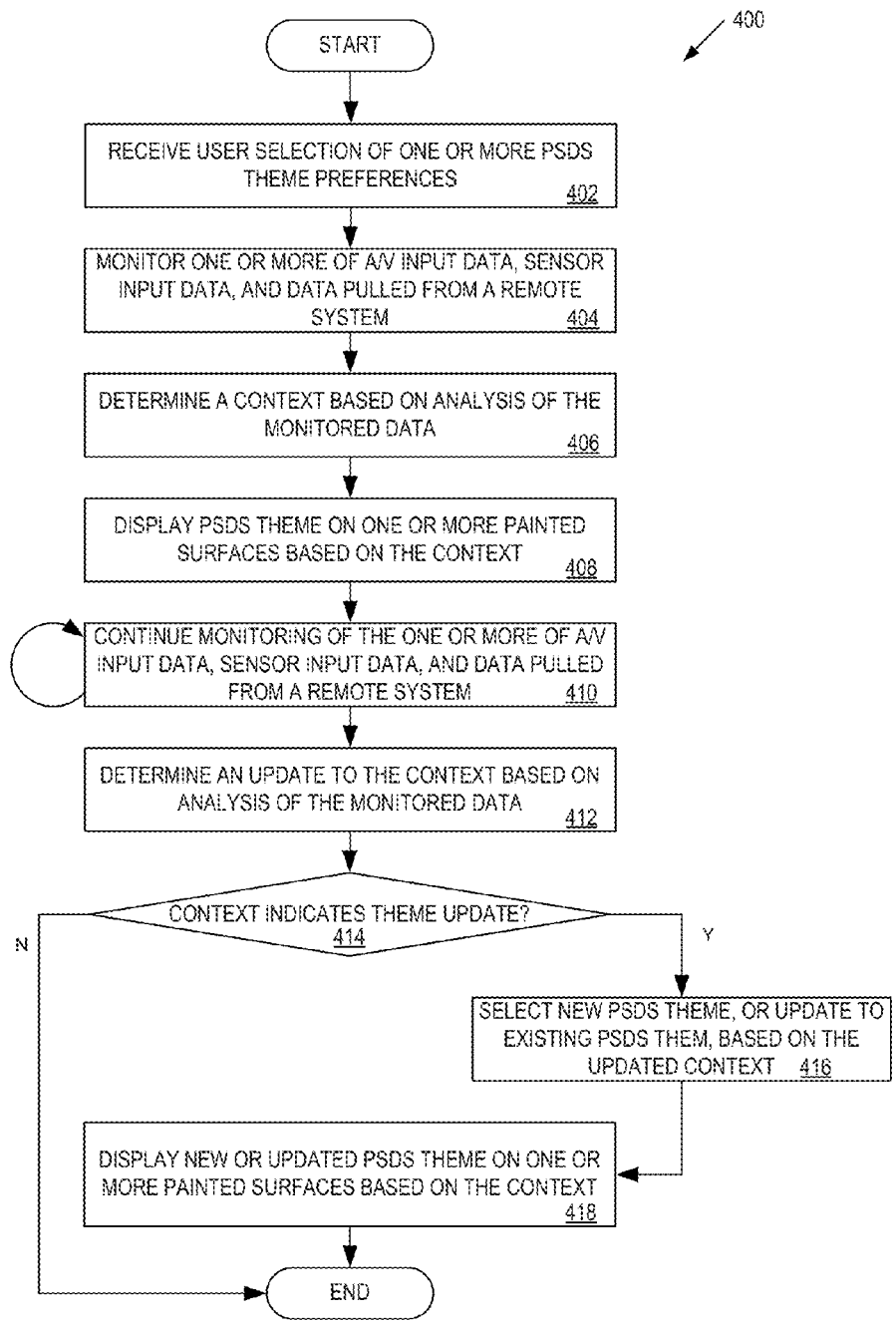
FIG. 4 is a flow diagram of one embodiment of a method for displaying context-based themes using a painted surface display system.

FIG. 4 is a flow diagram of one embodiment of a method 400 for displaying context-based themes using a painted surface display system. The method 400 is performed by processing logic that may comprise hardware (circuitry, dedicated logic, etc.), software (such as is run on a general purpose computer system or a dedicated machine), firmware, or a combination. In one embodiment, the method 300 is performed by PSDS 120 or PSDS 220.

Referring to FIG. 4, processing logic begins by receiving user selection of one or more theme preferences (processing block 402). In contrast to the user preferences discussed above in FIG. 3, the received user preferences are relevant to which themes are to be displayed and how those themes are to be displayed. For example, if a PSDS has 20 stored themes, a user preference might specify that a sports based theme is to be displayed while the user is watching a sporting event, another user preference might specify that a weather theme is to be displayed at specific times of the day, yet another user preference might specify that when user A is recognized proximate to a photo-active-painted surface a color-based theme selected by the user is to be displayed, etc. Although specific theme preferences and themes are discussed above, additional preferences and themes could be utilized in accordance with the discussion herein.

Processing logic monitors one or more of A/V input data, sensor data, and data pulled from external sources, such as remote servers (processing block 404). Processing logic utilizes the monitored data to determine a context (processing block 406). In one embodiment, processing logic utilizes one or more computer vision processes to analyze received A/V input data (e.g., image recognition, motion recognition, gesture recognition, etc.). Additionally, processing logic may perform voice recognition on any received audio data, as well as analysis of sensor data. In one embodiment, processing logic also analyzes inherent context data, such as the time of day, time of year, etc. Although each of these forms of context data enables processing logic to determine the context, processing logic may utilize a combination of different types of context data to improve the accuracy and precision of the determined real-world context.

Processing logic displays a PSDS theme on one or more photo-active painted surfaces based on the determined context (processing block 408). That is, processing logic analyzes real-world data to determine a real-world context of a PSDS (i.e., what users are physically proximate to the PSDS, is it night or day, is it a specific time of year, etc.). Based on the determined real-world context, a theme is selected and displayed which is relevant to the real-world context. In one embodiment, processing logic drives a spatial EM modulator to cause the theme to be displayed on photo-active paint. In one embodiment, the theme continues to be displayed for a period of time based on the photo-active paint's chemistry, even when the EM modulator is obstructed. That is, because photo-active paint's reaction to stimulation by the EM modulator causes photo-active paint to display the image, even when an object (i.e., a person, object, animal, etc.) obstructs a line of sight between the spatial EM modulator and the photo-active painted surface, the photo-active paint continues to persist and display the theme image for a period of time.

In one embodiment, processing logic continues to monitor the A/V input data, sensor data, and data obtained from remote sources (processing block 410). In one embodiment, processing logic monitors the different forms of data continuously or periodically. Processing logic then determines an update to the context based on analysis of the monitored data (processing block 412). In one embodiment, processing logic's continued monitoring enables themes to be refreshed dynamically and automatically by processing logic as a real-world context changes around a PSDS. Thus processing logic determines whether the context has changed (processing block 414). When there is a change to the context, processing logic selects and displays a theme based on the updated context (processing blocks 418 and 420). In one embodiment, the theme change may be a change between themes (i.e., user A has left a room, but user B has entered the room). In one embodiment, although the theme itself does not change, one or more characteristics of the theme may be changed or updated (i.e., a sports-based theme updates a scoreboard to reflect the most recent score in an event).

Figure 5:
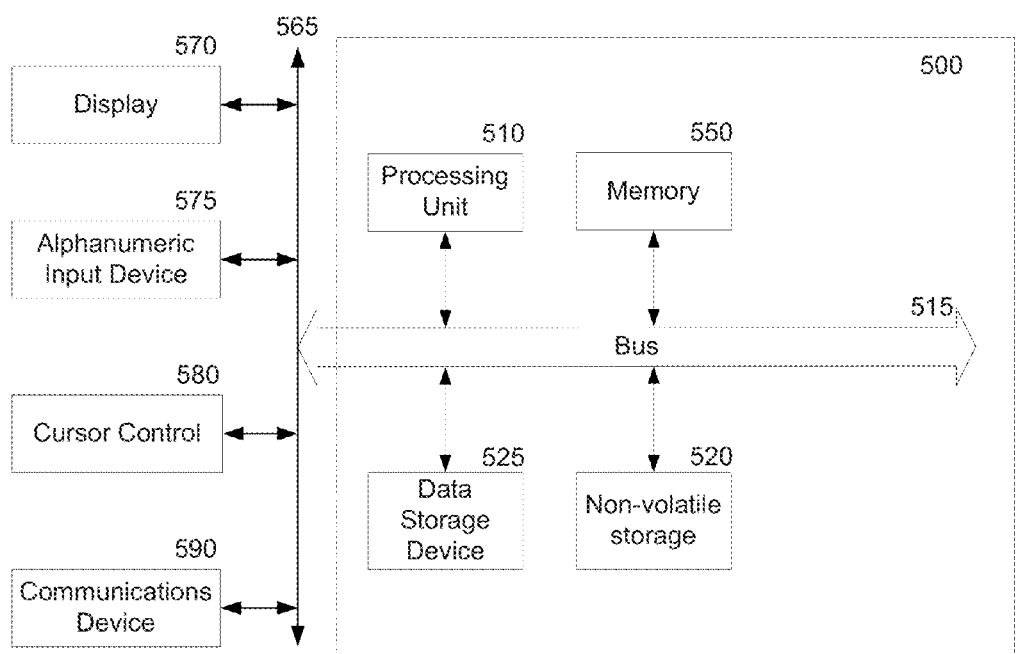
FIG. 5 illustrates a diagrammatic representation of a machine in the exemplary form of a computer system.

FIG. 5 is one embodiment of a computer system that may be used with the present invention. It will be apparent to those of ordinary skill in the art, however that other alternative systems of various system architectures may also be used.

The data processing system illustrated in FIG. 5 includes a bus or other internal communication means 515 for communicating information, and a processor 510 coupled to the bus 515 for processing information. The system further comprises a random access memory (RAM) or other volatile storage device 550 (referred to as memory), coupled to bus 515 for storing information and instructions to be executed by processor 510. Main memory 550 also may be used for storing temporary variables or other intermediate information during execution of instructions by processor 510. The system also comprises a read only memory (ROM) and/or static storage device 520 coupled to bus 515 for storing static information and instructions for processor 510, and a data storage device 525 such as a magnetic disk or optical disk and its corresponding disk drive. Data storage device 525 is coupled to bus 515 for storing information and instructions.

The system may further be coupled to a display device 570, such as a cathode ray tube (CRT) or a liquid crystal display (LCD) coupled to bus 515 through bus 565 for displaying information to a computer user. An alphanumeric input device 575, including alphanumeric and other keys, may also be coupled to bus 515 through bus 565 for communicating information and command selections to processor 510. An additional user input device is cursor control device 580, such as a mouse, a trackball, stylus, or cursor direction keys coupled to bus 515 through bus 565 for communicating direction information and command selections to processor 510, and for controlling cursor movement on display device 570.

Another device, which may optionally be coupled to computer system 500, is a communication device 590 for accessing other nodes of a distributed system via a network. The communication device 590 may include any of a number of commercially available networking peripheral devices such as those used for coupling to an Ethernet, token ring, Internet, or wide area network. The communication device 590 may further be a null-modem connection, or any other mechanism that provides connectivity between the computer system 500 and the outside world. Note that any or all of the components of this system illustrated in FIG. 5 and associated hardware may be used in various embodiments of the present invention.

It will be appreciated by those of ordinary skill in the art that any configuration of the system may be used for various purposes according to the particular implementation. The control logic or software implementing the present invention can be stored in main memory 550, mass storage device 525, or other storage medium locally or remotely accessible to processor 510.

It will be apparent to those of ordinary skill in the art that the system, method, and process described herein can be implemented as software stored in main memory 550 or read only memory 520 and executed by processor 510. This control logic or software may also be resident on an article of manufacture comprising a computer readable medium having computer readable program code embodied therein and being readable by the mass storage device 525 and for causing the processor 510 to operate in accordance with the methods and teachings herein.

The present invention may also be embodied in a handheld or portable device containing a subset of the computer hardware components described above. For example, the handheld device may be configured to contain only the bus 515, the processor 510, and memory 550 and/or 525. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 510, a data storage device 525, a bus 515, and memory 550, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

We claim:
1. A method, comprising:
capturing image data with at least a camera of a painted surface display system;
analyzing the image data to determine a real-world context proximate to a painted surface, wherein the painted surface is painted with a photo-active paint;
selecting a theme based on the determined real-world context;
generating a theme image; and driving a spatial electromagnetic modulator to emit electromagnetic stimulation in the form of the theme image to cause the photo active paint to display the theme image.

2. The method of claim 1, wherein determination of the real-world context further comprises:
capturing an image or video of one of a plurality of different users with the camera;
performing one or more computer vision processes on the image or video to determine an identity of a user from among the plurality of different users;
determining the real-world context based, at least in part, on the determined identity of the user.

3. The method of claim 2, wherein image recognition is performed on the image or video to recognize a face of the user.

4. The method of claim 1, wherein determination of the real-world context further comprises:
analyzing inherent context data, wherein the inherent context data includes one or more of a time of day, a time of year, and one or more user theme preferences; and
determining the real world context based on a combination of the inherent context data analysis and the image data analysis.

5. The method of claim 1, wherein the selected theme is a package of audio-visual data that contains content relevant to the determined real-world context, wherein the content is to be displayed by the photo-active paint in response to electromagnetic stimulation to customize an appearance of the painted surface.

6. The method of claim 5, wherein the selected theme is a color-based theme that customizes the appearance of the painted surface based on user color preferences.

7. The method of claim 5, wherein the selected theme is a weather-based theme that customizes the appearance of the painted surface based on weather data obtained from a remove server.

8. The method of claim 5, wherein the selected theme is a dynamic theme and the theme image is updated on a periodic basis over time based on an updated to the real-world context.

9. The method of claim 1, further comprising:
accessing a store of painted surface display system themes;
transmitting user purchase information for one of a plurality of different painted surface display system themes; and
downloading the one of the plurality of different painted surface display system themes to the painted surface display system.

10. The method of claim 1, wherein the photo-active paint is one of a photo-luminescent material that emits visible spectrum light in response to electromagnetic stimulation or a photochromatic material that changes light absorption properties in response to the electromagnetic stimulation, and wherein the theme image displayed on the photo-active paint persists for a period of time even when an obstruction moves into a path between the spatial electromagnetic modulator and the theme image displayed on photo-active paint.

11. A non-transitory computer readable storage medium including instructions that, when executed by a processor, cause the processor to perform a method comprising:
capturing image data with at least a camera of a painted surface display system;
analyzing the image data to determine a real-world context proximate to a painted surface, wherein the painted surface is painted with a photo-active paint;
selecting a theme based on the determined real-world context;
generating a theme image; and
driving a spatial electromagnetic modulator to emit electromagnetic stimulation in the form of the theme image to cause the photo active paint to display the theme image.

12. The non-transitory computer readable storage medium of claim 11, wherein determination of the real-world context further comprises:
capturing an image or video of one of a plurality of different users with the camera;
performing one or more computer vision processes on the image or video to determine an identity of a user from among the plurality of different users;
determining the real-world context based, at least in part, on the determined identity of the user.

13. The non-transitory computer readable storage medium of claim 12, wherein image recognition is performed on the image or video to recognize a face of the user.

14. The non-transitory computer readable storage medium of claim 11, wherein determination of the real-world context further comprises:
analyzing inherent context data, wherein the inherent context data includes one or more of a time of day, a time of year, and one or more user theme preferences; and
determining the real world context based on a combination of the inherent context data analysis and the image data analysis.

15. The non-transitory computer readable storage medium of claim 11, wherein the selected theme is a package of audio-visual data that contains content relevant to the determined real-world context, wherein the content is to be displayed by the photo-active paint in response to electromagnetic stimulation to customize an appearance of the painted surface.

16. The non-transitory computer readable storage medium of claim 15, wherein the selected theme is a color-based theme that customizes the appearance of the painted surface based on user color preferences.

17. The non-transitory computer readable storage medium of claim 15, wherein the selected theme is a weather-based theme that customizes the appearance of the painted surface based on weather data obtained from a remove server.

18. The non-transitory computer readable storage medium of claim 15, wherein the selected theme is a dynamic theme and the theme image is updated on a periodic basis over time based on an updated to the real-world context.

19. The non-transitory computer readable storage medium of claim 11, further comprising:
accessing a store of painted surface display system themes;
transmitting user purchase information for one of a plurality of different painted surface display system themes; and
downloading the one of the plurality of different painted surface display system themes to the painted surface display system.

20. The non-transitory computer readable storage medium of claim 11, wherein the photo-active paint is one of a photo-luminescent material that emits visible spectrum light in response to electromagnetic stimulation or a photochromatic material that changes light absorption properties in response to the electromagnetic stimulation, and wherein the theme image displayed on the photo-active paint persists for a period of time even when an obstruction moves into a path between the spatial electromagnetic modulator and the theme image displayed on photo-active paint.

21. A painted surface display system comprising:
a camera to capture image data;

an event detector to analyze the image data to determine a real-world context proximate to a painted surface, wherein the painted surface is painted with a photo-active paint;

a theme engine to select a theme based on the determined real-world context; and a display engine to generate a theme image, and drive a spatial electromagnetic modulator to emit electromagnetic stimulation in the form of the theme image to cause the photo active paint to display the theme image.

* * * * *